(12) United States Patent
Spada et al.

(10) Patent No.: US 9,920,141 B2
(45) Date of Patent: Mar. 20, 2018

(54) PROCESS FOR MANUFACTURING A DISPERSION OF A VINYLIDENE FLUORIDE POLYMER

(75) Inventors: Fabrizio Spada, Chelsea (AU); Bradley Lane Kent, Woolwich Township, NJ (US)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 555 days.

(21) Appl. No.: 13/516,017

(22) PCT Filed: Dec. 15, 2010

(86) PCT No.: PCT/EP2010/069754
§ 371 (c)(1),
(2), (4) Date: Jun. 14, 2012

(87) PCT Pub. No.: WO2011/073254
PCT Pub. Date: Jun. 23, 2011

(65) Prior Publication Data
US 2012/0283382 A1 Nov. 8, 2012

Related U.S. Application Data

(60) Provisional application No. 61/287,809, filed on Dec. 18, 2009.

(30) Foreign Application Priority Data

Jun. 4, 2010 (EP) .................................... 10164903

(51) Int. Cl.
*C08F 14/22* (2006.01)
(52) U.S. Cl.
CPC .................................... *C08F 14/22* (2013.01)
(58) Field of Classification Search
CPC ...................................................... C08F 14/22
USPC ................................. 526/204, 209
See application file for complete search history.

(56) References Cited

U.S. PATENT DOCUMENTS

| | | | |
|---|---|---|---|
| 3,948,953 A | 4/1976 | McCoy | |
| 4,380,618 A * | 4/1983 | Khan | C08F 214/26 526/206 |
| 5,285,002 A | 2/1994 | Grootaert | |
| 6,429,258 B1 * | 8/2002 | Morgan et al. | 524/805 |
| 6,878,772 B2 * | 4/2005 | Visca et al. | 524/757 |
| 7,122,610 B2 | 10/2006 | Wille et al. | |
| 2005/0282933 A1 * | 12/2005 | Patel et al. | 523/172 |
| 2008/0114121 A1 * | 5/2008 | Brothers | C08F 14/18 524/599 |
| 2008/0149878 A1 | 6/2008 | Kirsch et al. | |
| 2009/0148688 A1 * | 6/2009 | Sasaki | C09D 183/04 428/315.9 |
| 2009/0186969 A1 | 7/2009 | Coughlin et al. | |
| 2009/0281241 A1 * | 11/2009 | Brothers et al. | 524/758 |

FOREIGN PATENT DOCUMENTS

| | | |
|---|---|---|
| EP | 2133370 A1 | 12/2009 |
| EP | 2143738 A1 | 1/2010 |
| WO | 2006135825 A1 | 12/2006 |
| WO | WO 2008060460 A1 * | 5/2008 |
| WO | 2009137736 A1 | 11/2009 |
| WO | 2010003929 A1 | 1/2010 |

OTHER PUBLICATIONS

"Krytox 57 FS Oils", Safety Data Sheet, DuPont, Apr. 2015.*

* cited by examiner

*Primary Examiner* — Nicole Buie-Hatcher
(74) *Attorney, Agent, or Firm* — Osha Liang LLP

(57) ABSTRACT

A process for manufacturing a dispersions of a vinylidene fluoride (VDF) thermoplastic polymer [polymer (F)], said process comprising polymerizing VDF in an aqueous phase comprising:

at least one surfactant selected from the group consisting of non-fluorinated surfactants [surfactant (HS)] and fluorinated surfactants having a molecular weight of less than 400 [surfactant (FS)]; and at least one functional (per)fluoropolyether (functional PFPE) comprising at least one (per)fluoropolyoxyalkylene chain [chain $(R'_F)$] and at least one functional group, said functional PFPE having a number average molecular weight of at least 1000 and a solubility in water of less than 1% by weight at 25° C., wherein said functional PFPE is present in the aqueous phase in an amount of 0.001 to 0.3 g/l.

18 Claims, No Drawings

PROCESS FOR MANUFACTURING A DISPERSION OF A VINYLIDENE FLUORIDE POLYMER

CROSS-REFERENCE TO RELATED APPLICATIONS

This application is a U.S. national stage entry under 35 U.S.C. § 371 of International Application No. PCT/EP2010/069754 filed Dec. 15, 2010, which claims priority to U.S. provisional application No. 61/287,809 filed on Dec. 18, 2009 and to European application No. 10164903.6 filed on Jun. 4, 2010, the whole content of each of these applications being incorporated herein by reference for all purposes.

TECHNICAL FIELD

The present invention pertains to a novel polymerization process for manufacturing vinylidene fluoride (VDF) polymer aqueous dispersions having particles with an average diameter from 0.1 to 0.3 micrometers, which are suitable for the formulation of paints, e.g. for high performance external architectural coatings.

BACKGROUND ART

PVDF-based paints have been used since more than four decades for the coil painting for architecture as they are capable to produce high performance coatings.

Generally, the PVDF-based painting compositions comprise pigments, resins, generally acrylic resins, and various additives and can be applied in a liquid form, when formulated in water or in particular solvents, or in powder form.

Known high performance paints used for coatings in architecture are PVDF based dispersions, having particles with an average diameter between 150 to 350 nm prepared by emulsion polymerization in the presence of a surfactant formed of a mixture of perfluoroalkanoic acids having a chain length between 7 and 13 carbon atoms and average molecular weight of about 480. Said surfactant is commercially known as Surflon™ S111 (Asahi Glass). The PVDF dispersion prepared by polymerization by using this fluorosurfactants mixture is coagulated, and the polymer is then washed, dried in a spray dryer and then formulated with other additives to obtain the paint.

Nevertheless, recently, perfluoroalkanoic acids, in particular those having 8 or more carbon atoms, have raised environmental concerns. For instance, perfluoroalkanoic acids have been found to show bioaccumulation. Accordingly, efforts are now devoted to phasing out from such compounds and methods have been developed to manufacture fluoropolymer products using alternative surfactants having a more favourable toxicological profile.

Several approaches have been recently pursued to this aim, typically involving either non fluorinated, partially fluorinated or even perfluorinated surfactants, these latter typically comprising perfluoroalkyl linear or cyclic chains interrupted by one or more catenary oxygen atoms, said chains having an ionic carboxylate group at one of its ends.

Nevertheless, all these surfactants do not possess suitable nucleating behaviour for providing VDF polymer particles having suitable sizes; these surfactants thus fail to enable tuning particle size of the latex in the range suitable for paints formulation.

DISCLOSURE OF INVENTION

It is thus an object of the present invention a process for manufacturing a dispersion of a vinylidene fluoride (VDF) thermoplastic polymer [polymer (F)], said process comprising polymerizing VDF in an aqueous phase comprising:
  at least one surfactant selected from the group consisting of non-fluorinated surfactants [surfactant (HS)] and fluorinated surfactants having a molecular weight of less than 400 [surfactant (FS)]; and
  at least one functional (per)fluoropolyether (functional PFPE) comprising at least one (per)fluoropolyoxyalkylene chain [chain ($R'_F$)] and at least one functional group, said functional PFPE having a number average molecular weight of at least 1000 and a solubility in water of less than 1% by weight at 25° C.,
wherein said functional PFPE is present in the aqueous phase in an amount of 0.001 to 0.3 g/l.

The Applicant has surprisingly found that in above mentioned process, the addition of a small amount of a high molecular weight functional perfluoropolyether enables efficient nucleation and tuning of the average particle size of the polymer (F), while the hydrogenated surfactant and/or the low molecular weight fluorosurfactant ensure efficient colloidal stabilization of the dispersion.

More particularly, while average particle size of the particles of polymer (F) was found to be more or less insensitive of the concentration of the surfactant (HS) or (FS), concentration of functional PFPE can be efficiently used for tuning average particles size of said polymer (F).

In other words, the combination of any of surfactant (HS) and (FS) with functional PFPE as above detailed advantageously enables separating nucleating ability (due to the functional PFPE) from colloidal stabilization ability (due to the surfactant (HS) or (FS)).

The expression 'thermoplastic' is used herein to denote a semi-crystalline VDF polymer which can advantageously processed in the melt and which possesses typically a heat of fusion of more than 5 J/g, preferably more than 7 J/g, even more preferably 10 J/g, when measured according to ASTM D 3418.

The vinylidene fluoride thermoplastic polymer [polymer (F)] is preferably a polymer comprising:
(a') at least 60% by moles, preferably at least 75% by moles, more preferably 85% by moles of vinylidene fluoride (VDF);
(b') optionally from 0.1 to 15%, preferably from 0.1 to 12%, more preferably from 0.1 to 10% by moles of a fluorinated monomer different from VDF; said fluorinate monomer being preferably selected in the group consisting of vinylfluoride ($VF_x$), chlorotrifluoroethylene (CTFE), hexafluoropropene (HFP), tetrafluoroethylene (TFE), perfluoromethylvinylether (MVE), trifluoroethylene (TrFE) and mixtures therefrom; and
(c') optionally from 0.1 to 5%, by moles, preferably 0.1 to 3% by moles, more preferably 0.1 to 1% by moles, based on the total amount of monomers (a') and (b'), of one or more hydrogenated comonomer(s).

The vinylidene fluoride polymer [polymer (F)] is more preferably a polymer consisting of:
(a') at least 60% by moles, preferably at least 75% by moles, more preferably 85% by moles of vinylidene fluoride (VDF);
(b') optionally from 0.1 to 15%, preferably from 0.1 to 12%, more preferably from 0.1 to 10% by moles of a fluorinated monomer different from VDF; said fluorinate monomer being preferably selected in the group consisting of vinylfluoride ($VF_x$), chlorotrifluoroethylene (CTFE), hexafluoropropene (HFP), tetrafluoroethylene (TFE), perfluoromethylvinylether (MVE), trifluoroethylene (TrFE) and mixtures therefrom.

As non limitative examples of the VDF polymers of the present invention, mention can be notably made of homopolymer of VDF, VDF/TFE copolymer, VDF/TFE/HFP copolymer, VDF/TFE/CTFE copolymer, VDF/TFE/TrFE copolymer, VDF/CTFE copolymer, VDF/HFP copolymer, VDF/TFE/HFP/CTFE copolymer and the like.

The process of the invention is particularly suitable for manufacturing VDF homopolymers.

The melt viscosity of the polymer (F), measured at 232° C. and 100 sec$^{-1}$ of shear rate according to ASTM D3835, is advantageously of at least 5 kpoise, preferably at least 10 kpoise.

The melt viscosity of the polymer (F), measured at 232° C. and 100 sec$^{-1}$ of shear rate, is advantageously of at most 60 kpois, preferably at most 40 kpoise, more preferably at most 35 kpoise.

The melt viscosity of VDF polymer is measured in accordance with ASTM test No. D3835, run at 232° C., under a shear rate of 100 sec$^{-1}$.

The VDF polymer has a melting point of advantageously at least 120° C., preferably at least 125° C., more preferably at least 130° C.

The VDF polymer has a melting point advantageously of at most 190° C., preferably at most 185° C., more preferably at most 170° C.

The melting point ($T_{m2}$) can be determined by DSC, at a heating rate of 10° C./min, according to ASTM D 3418.

The surfactant can be a non-fluorinated surfactant, that is to say a surfactant which is free from fluorine.

The choice of the surfactant (HS) is not particularly critical. Generally anionic surfactants comprising at least one anionic functionality, preferably selected from the group consisting of:

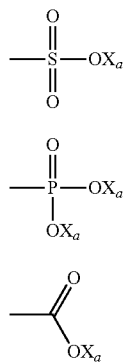

wherein $X_a$ is a hydrogen atom, a monovalent metal, preferably an alkaline metal, or an ammonium group of formula —N(R'$_n$)$_4$, wherein R'$_n$, equal or different at each occurrence, is a hydrogen atom or a $C_1$-$C_6$ hydrocarbon group, preferably an alkyl group; will be preferred.

Surfactants (HS) which can be used in the process of the invention can be notably selected among alkanesulfonates, preferably selected from linear $C_7$-$C_{20}$ 1-alkanesulfonates, linear $C_7$-$C_{20}$ 2-alkanesulfonates, and linear $C_7$-$C_{20}$ 1,2-alkanedisulfonates. These surfactants (HS) have been notably described in U.S. Pat. No. 7,122,610 (ARKEMA INC) 27 Oct. 2005. Non limitative examples thereof are 1-octanesulfonates, 2-octanesulfonates, 1,2-octanedisulfonates, 1-decanesulfonates, 2-decanesulfonates, 1,2-decanedisulfonates, 1-dodecanesulfonates, 2-dodecanesulfonates, 1,2-dodecanedisulfonates, and mixtures of any of these. As used herein, the term "alkanesulfonate(s)" and terms ending with the term "sulfonate(s)" or "disulfonate(s)," such as those used above, refer to alkali metal, ammonium, or monoalkyl-, dialkyl-, trialkyl-, or tetraalkyl-substituted ammonium salts of alkanesulfonic or alkanedisulfonic acids. Sodium, potassium, and ammonium alkanesulfonates, or mixtures of any of these, can be typically used. The use of ammonium ion as the counterion to the alkanesulfonate ion is generally preferred.

Surfactants (HS) which can be used in the process of the invention can be notably further selected among alkylsulfates, preferably selected from linear $C_7$-$C_{20}$ 1-alkylsulfates, linear $C_7$-$C_{20}$ 2-alkylsulfates, and linear $C_7$-$C_{20}$ 1,2-alkyldisulfates. Non limitative examples thereof are 1-octylsulfates, 2-octylsulfates, 1,2-octyldisulfates, 1-decylsulfates, 2-decylsulfates, 1,2-decyldisulfates, 1-dodecylsulfates, 2-dodecylsulfates, 1,2-dodecyldisulfates, and mixtures of any of these. As used herein, the term "alkylsulfate(s)" and terms ending with the term "sulfate(s)" or "disulfate(s)," such as those used above, refer to alkali metal, ammonium, or monoalkyl-, dialkyl-, trialkyl-, or tetraalkyl-substituted ammonium salts of alkylsulfuric or alkyldisulfuric acids. Sodium, potassium, and ammonium alkylsulfates, or mixtures of any of these, can be typically used. The use of ammonium ion as the counterion to the alkylsulfate ion is generally preferred.

As an alternative, the surfactant can be a fluorine-containing surfactant (i.e. a fluorinated surfactant) [surfactant (FS)], as above defined. The surfactant (FS) has a molecular weight of less than 400; the Applicant has found that only surfactants (FS) complying with this requirement are endowed with an appropriate toxicological profile which made them more acceptable from an environmental point of view.

It is nevertheless understood that mixture of one or more surfactant (HS) and one or more surfactant (FS) can be used in the process of the invention.

It is generally preferred that the surfactant (FS) comprise at least one catenary oxygen atom.

According to a first embodiment of the invention, the surfactant (FS) complies with formula (IA) here below:

wherein $R_f$ is a $C_1$-$C_3$ perfluoroalkyl group comprising, optionally, one or more ether oxygen atoms, k is 2 or 3 and $X_a$ is selected from a monovalent metal and an ammonium group of formula $NR^N_4$, wherein $R^N$, equal or different at each occurrence, is a hydrogen atom or a $C_1$-$C_3$ alkyl group.

A mixture of more than one surfactant (FS) having formula (IA) as described above may also be used in this embodiment of the process of the invention.

The surfactant (FS) of this first embodiment preferably complies with formula (IIA) here below:

wherein:
$R_f'$ is a $C_1$-$C_3$ perfluoroalkyl group;
$X_a'$ is selected from Li, Na, K, NH$_4$ and NR$^M_4$, wherein R$^M$ is a $C_1$-$C_3$ alkyl group.

Still more preferably, the surfactant (FS) of the first embodiment complies with formula (IIIA) here below:

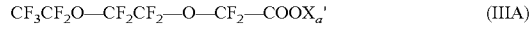

wherein $X_a'$ has the same meaning as defined above.

According to a second embodiment of the invention, the surfactant (FS) complies with formula (IB) here below:

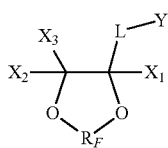
(IB)

wherein:
- $X_1$, $X_2$ and $X_3$, equal to or different from each other, are independently selected from H, F and $C_1$-$C_6$ (per)fluoroalkyl groups, optionally comprising one or more catenary or non-catenary oxygen atoms,
- $R_F$ represents a divalent perfluorinated $C_1$-$C_3$ bridging group,
- L represents a bond or a divalent group and
- Y represents an anionic functionality, preferably selected from the group consisting of:

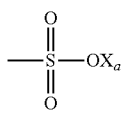
(1')

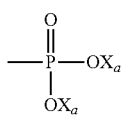
(2')

(3')

wherein $X_a$ is a hydrogen atom, a monovalent metal, preferably an alkaline metal, or an ammonium group of formula —N(R'$_n$)$_4$, wherein R'$_n$, equal or different at each occurrence, is a hydrogen atom or a $C_1$-$C_6$ hydrocarbon group, preferably an alkyl group.

According to a first variant of this second embodiment of the invention, the surfactant (FS) complies with formula (IIB) here below:

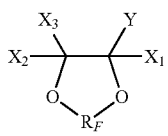
(IIB)

wherein $X_1$, $X_2$, $X_3$, $R_F$ and Y have the same meaning as defined above. The surfactant (FS) of formula (IIB) preferably complies with formula (IIIB) here below:

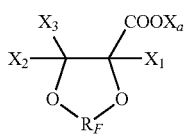
(IIIB)

wherein $X_1$, $X_2$, $X_3$, $R_F$ and $X_a$ have the same meaning as defined above. The surfactant (FS) of formula (IIIB) can comply with formula (IVB) here

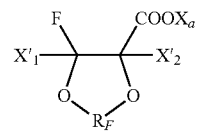
(IVB)

wherein $X'_1$ and $X'_2$, equal to or different from each other, are independently a fluorine atom, a —R'$_f$ group or a —OR'$_f$ group, wherein R'$_f$ is a $C_1$-$C_3$ perfluoroalkyl group, preferably with the proviso that at least one of $X'_1$ and $X'_2$ are different from fluorine, and $R_F$ and $X_a$ have the same meanings as defined above. Compounds of formula (IV) as described above can be notably manufactured as detailed in co-pending European Patent Applications No 08159936.7 and 08168221.3. The surfactant (FS) having formula (IVB) of the first variant of this second embodiment preferably complies with formula (VB) here below:

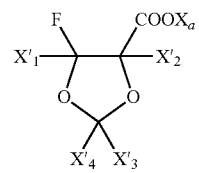
(VB)

wherein $X'_1$, $X'_2$, $X'_3$, $X'_4$, equal to or different each other, are independently a fluorine atom, a —R'$_f$ group or a —OR'$_f$ group, wherein R'$_f$ is a $C_1$-$C_3$ perfluoroalkyl group.

Non limitative examples of surfactants (FS) having formula (VB) as described above include, notably, the followings:

(VB-a)

(VB-b)

(VB-c)

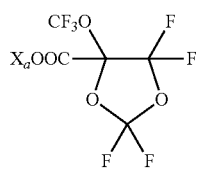
(VB-d)

As an alternative, surfactant (FS) of formula (IIIB) can comply with formula (VIB) here below:

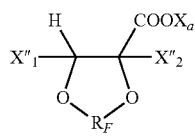
(VIB)

wherein $X''_1$ and $X''_2$, equal to or different from each other, are independently a fluorine atom, a —$R'_f$ group or a —$OR'_f$ group, wherein $R'_f$ is a $C_1$-$C_3$ perfluoroalkyl group, and $R_F$ and $X_a$ have the same meanings as defined above. Compounds of formula (VIB) as described above can be notably manufactured as detailed in co-pending European Patent Applications No 08159936.7 and 08168221.3.

The surfactant (FS) having formula (VIB) preferably complies with formula

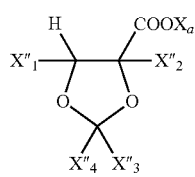
(VIIB)

wherein $X''_1$, $X''_2$, $X''_3$, $X''_4$, equal to or different each other, are independently a fluorine atom, a —$R'_f$ group or a —$OR'_f$ group, wherein $R'_f$ is a $C_1$-$C_3$ perfluoroalkyl group.

Non limitative examples of surfactants (FS) having formula (VIIB) as described above include, notably, the followings:

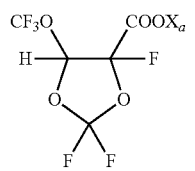
(VIIB-a)

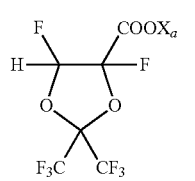
(VIIB-b)

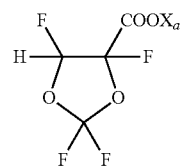
(VIIB-c)

According to a second variant of this second embodiment of the invention, the surfactant (FS) complies with formula (VIIIB) here below:

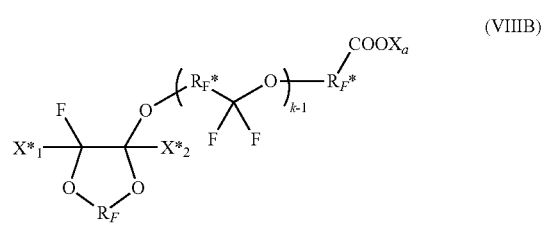
(VIIIB)

wherein $R_F$ and $X_a$ have the same meanings as defined above, $X^*_1$ and $X^*_2$, equal to or different from each other, are independently a fluorine atom, a —$R'_f$ group or a —$OR'_f$ group, wherein $R'_f$ is a $C_1$-$C_3$ perfluoroalkyl group, $R^*_F$ is a divalent fluorinated group and k is an integer from 1 to 3. Compounds of formula (VIIIB) as described above can be notably manufactured as detailed in co-pending European Patent Applications No 08159936.7 and 08168221.3.

The surfactant (FS) of formula (VIIIB) preferably complies with formula (IXB) here below:

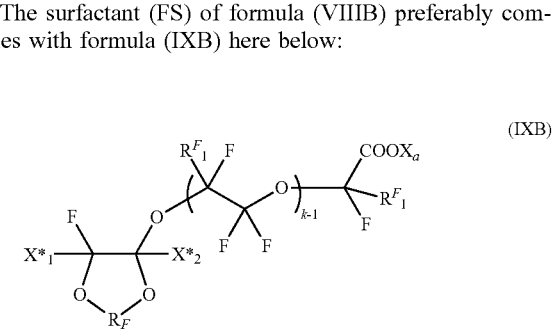
(IXB)

wherein $R^F$ and $X_a$ have the same meanings as defined above, $X^*_1$ and $X^*_2$, equal to or different from each other, are independently a fluorine atom, a —$R'_f$ group or a —$OR'_f$ group, wherein $R'_f$ is a $C_1$-$C_3$ perfluoroalkyl group, $R^F_1$ is a fluorine atom or a —$CF_3$ group and k is an integer from 1 to 3.

Among these compounds, surfactants (FS) having formulae (X) and (XI) here below:

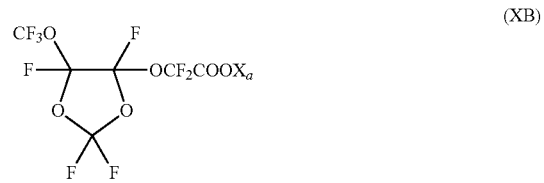
(XB)

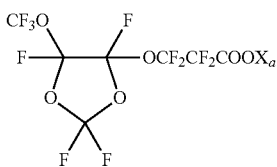

(XIB)

wherein $X_a$ has the meaning as defined above, have been found particularly useful in the process of the invention.

According to a third embodiment of the invention, the surfactant (FS) complies with formula:

$$R_{FS}\text{-E-}Y_r$$

wherein:
Y$_r$ is an anionic functionality, preferably selected from the group consisting of:

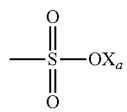

(1')

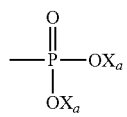

(2')

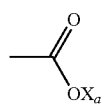

(3')

wherein $X_a$ is a hydrogen atom, a monovalent metal, preferably an alkaline metal, or an ammonium group of formula —N(R'$_n$)$_4$, wherein R'$_n$, equal or different at each occurrence, is a hydrogen atom or a C$_1$-C$_6$ hydrocarbon group, preferably an alkyl group;

E is a C$_4$-C$_{24}$ hydrocarbon non fluorinated divalent group, possibly comprising one or more catenary oxygen atom(s); and R$_{FS}$ is a —OR$^{FS}_f$ group, a —N(R$^{FS}_p$)$_2$, or a —OAr(R$^{FS}_p$)$_r$ group, wherein R$^{FS}_p$, equal to or different from each other at each occurrence, is a C$_1$-C$_6$ perfluoroalkyl group, Ar is an aromatic moiety (e.g. a phenyl group), and r is an integer of 1 to 3.

Examples of surfactants (FS) of this third embodiment are notably disclosed in US 2008149878 26 Jun. 2008.

The surfactant (FS) according to this third embodiment of the invention preferably complies with formula:

$$R_{FS}(CH_2)_nSO_3X_r$$

wherein:
X$_r$ is a hydrogen atom, a monovalent metal, preferably an alkaline metal, or an ammonium group of formula —N(R'$_n$)$_4$, wherein R'$_n$, equal or different at each occurrence, is a hydrogen atom or a C$_1$-C$_6$ hydrocarbon group, preferably an alkyl group;
n is an integer of 4 to 20; and
R$_{FS}$ is a —OR$^{FS}_f$ group, a —N(R$^{FS}_p$)$_2$, or a —OAr(R$^{FS}_p$)$_r$ group, wherein R$^{FS}_p$, equal to or different from each other at each occurrence, is a C$_1$-C$_6$ perfluoroalkyl group, Ar is an aromatic moiety (e.g. a phenyl group), and r is an integer of 1 to 3.

The surfactant (FS) of this third embodiment more preferably complies with formula R$_{FS}$(CH$_2$)$_n$SO$_3$X$_r$, with R$_{FS}$ being selected from the group consisting of —OCF$_3$, —N(CF$_3$)$_2$ and

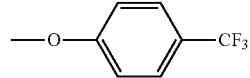

The total amount of surfactant(s) (FS) and/or (HS) is not particularly limited and will be advantageously selected to the aim of achieving suitable colloidal stability. In general, concentrations of surfactant (FS) and/or (HS) of from 0.01 to 10 g/l in the aqueous phase will be preferred.

The aqueous phase of the process of the present invention also comprises at least one functional (per)fluoropolyether (functional PFPE) comprising at least one (per)fluoropolyoxyalkylene chain [chain (R'$_F$)] and at least one functional group, said functional PFPE having a number average molecular weight of at least 1000 and a solubility in water of less than 1% by weight at 25° C.

The Applicant has surprisingly found that when a functional PFPE is used failing to satisfy above mentioned requirements of molecular weight and solubility, its nucleating activity is not effective and technical effects of the invention are not achieved.

On the contrary, a functional PFPE fulfilling said molecular weight and said solubility features has been found to effectively perform in the method of the present invention to produce particles of the required size thanks to its outstanding nucleating activity.

The functional PFPE has a solubility in water of preferably less than 0.5%, more preferably of less than 0.1% by weight at 25° C.

The (per)fluoropolyoxyalkylene chain [chain (R'$_F$)] of the functional PFPE typically comprises one or more recurring units R" having general formula —(CF$_2$)$_j$—CFZO—, wherein Z is selected from a fluorine atom and a C$_1$-C$_5$ (per)fluoro(oxy)alkyl group and j is an integer comprised between 0 and 3, the recurring units being generally statistically distributed along the (per)fluoropolyoxyalkylene chain.

The functional PFPE has a number average molecular weight of preferably at least 1300, more preferably at least 1500.

The "number average molecular weight" is hereby expressed by the $$M_n = \frac{\sum M_i \cdot N_i}{\sum N_i}$$

wherein N$_i$ represents the number of molecules having average molecular weight M$_j$.

The functional PFPE preferably comprises at least one functional group selected from carboxylic acid, phosphonic acid and sulphonic acid groups, in their acid or salt form.

The functional PFPE more preferably complies with formula (XII) here below:

$$T_1\text{-(CFW}_1)_{p1}\text{—O—}R_F\text{—(CFW}_2)_{p2}\text{-T}_2 \tag{XII}$$

wherein:
R$_F$ is a (per)fluoropolyoxyalkylene chain [chain (R'$_F$)], as defined above, such that the number average molecular weight of the functional PFPE is at least 1000, preferably at least 1300, more preferably at least 1500;

$T_1$ and $T_2$, equal to or different from each other, are selected from:

i) functional end-groups selected from carboxylic acid, phosphonic acid and sulphonic acid groups, in their acid or salt form, and ii) non-functional end-groups selected from a fluorine atom, a chlorine atom and a $C_1$-$C_3$ (per)fluoroalkyl group comprising, optionally, one or more chlorine atoms, with the proviso that at least one of $T_1$ and $T_2$ is a functional end-group as defined above;

$W_1$ and $W_2$, equal to or different from each other, independently represent a fluorine atom or a —$CF_3$ group;

$p_1$ and $p_2$, equal to or different from each other, are independently integers comprised between 1 and 3, preferably being equal to 1 when $W_1$ and/or $W_2$ are —$CF_3$ groups.

The aqueous phase preferably comprises at least one functional PFPE complying with formula (XII) as described above wherein both $T_1$ and $T_2$ are functional end-groups as defined above (bifunctional PFPE).

Non-limitative examples of suitable bifunctional PFPEs include, notably, those complying with formula (XIII) here below:

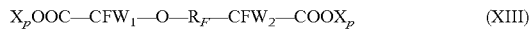

$$X_p OOC—CFW_1—O—R_F—CFW_2—COOX_p \qquad (XIII)$$

wherein:

$R_F$ is a (per)fluoropolyoxyalkylene chain [chain ($R'_F$)] as defined above such that the number average molecular weight of the bifunctional PFPE is at least 1000, preferably at least 1300, more preferably at least 1500;

$W_1$ and $W_2$, equal to or different from each other, have the same meaning as defined above;

$X_p$, equal to or different from each other, is a hydrogen atom, a monovalent metal, preferably an alkaline metal, or an ammonium group of formula —$N(R'_n)_4$, wherein $R'_n$, equal or different at each occurrence, is a hydrogen atom or a $C_1$-$C_6$ hydrocarbon group, preferably an alkyl group.

More preferred aqueous phases comprise at least one bifunctional PFPE complying with formula (XIV) here below:

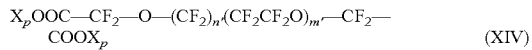

$$X_p OOC—CF_2—O—(CF_2)_{n'}(CF_2CF_2O)_{m'}—CF_2—COOX_p \qquad (XIV)$$

wherein n' and m' are independently integers >0 such that the number average molecular weight of the bifunctional PFPE is at least 1000, preferably at least 1300, more preferably at least 1500, the recurring units being generally statistically distributed along the perfluoropolyoxyalkylene chain, and $X_p$ has the meaning as above defined.

The functional perfluoropolyether is present in the aqueous phase in an amount of 0.001 to 0.3 g/l.

Preferably, the functional PFPE is present in an amount of 0.001 to 0.15 g/l, preferably of 0.001 to 0.1 g/l in the aqueous phase.

The Applicant has surprisingly found that, while the functional PFPE alone cannot provide with adequate stabilization during polymerization, by addition of functional PFPE to the surfactant (FS) as above detailed in above mentioned amounts it is advantageously possible to fine tuning the average molecular weight of the polymer (F) and simultaneously achieving high solid concentrations and outstanding colloidal stability.

By selecting a concentration of functional PFPE of from 0.001 to 0.1 g/l, it is advantageously possible to obtain a dispersion of polymer (F) having an average particle size of from 300 to 150 nm.

To the aim of manufacturing polymer (F) dispersions suitable for formulating architectural coating paints, i.e. dispersions with average particles size of 250 to 300 nm, the amount of functional PFPE will be selected in the range of 0.001 to 0.005 g/l.

The polymerization process of the invention is typically started by an initiator. Suitable initiators include any of the initiators known for initiating a free radical polymerization of vinylidene fluoride.

Non-limitative examples of suitable initiators include, notably, inorganic initiators and peroxide initiators.

Representative examples of inorganic initiators include, notably, ammonium-, alkali- or earth alkali-salts of persulfates or (per)manganic acids. A persulfate initiator, e.g. ammonium persulfate, can be used on its own or may be used in combination with a reducing agent. Suitable reducing agents include bisulfites such as, e.g., ammonium bisulfite or sodium metabisulfite, thiosulfates such as, e.g., ammonium, potassium or sodium thiosulfate, hydrazines, azodicarboxylates and azodicarboxyldiamide. Further reducing agents which may be used include sodium formaldehyde sulfoxylate (Rongalite) or fluoroalkyl sulfinates as disclosed in U.S. Pat. No. 5,285,002 (MINNESOTA MINING AND MANUFACTURING CO.) 8 Feb. 1994. The reducing agent typically reduces the half-life time of the persulfate initiator. Additionally, a metal salt catalyst such as, e.g., copper, iron or silver salts may be added.

Representative examples of peroxide initiators include, notably, hydrogen peroxide, sodium or barium peroxide, diacylperoxides such as, e.g., diacetylperoxide, disuccinyl peroxide, dipropionylperoxide, dibutyrylperoxide, dibenzoylperoxide, di-tert-butylperoxide, benzoylacetylperoxide, diglutaric acid peroxide and dilaurylperoxide, and further per-acids and salts thereof such as, e.g., ammonium, sodium or potassium salts. Specific examples of per-acids include, notably, peracetic acid. Esters of the peracid can be used as well and examples thereof include tert-butylperoxyacetate and tert-butylperoxypivalate.

The amount of initiator typically ranges between 0.01% and 1% by weight, preferably between 0.01 and 0.5% by weight with respect to the weight of the polymer (F) to be produced.

The polymerization process may be carried out in the presence of other materials such as, notably, chain-transfer agents. Non-limitative examples of chain transfer agents suitable for the purpose of the process of the invention include, notably, compounds of formula $R_f(I)_x(Br)_y$, wherein $R_f$ is a $C_1$-$C_8$ (per)fluoro(chloro)alkyl group, x and y are independently integers between 0 and 2, the (x+y) sum being comprised between 1 and 2, such as, e.g., 1,4-diiodoperfluorobutane. Further chain-transfer agents which may be used include, notably, $C_1$-$C_5$ alkanes such as, e.g., ethane, propane and n-pentane, halogenated hydrocarbons such as, e.g., $CCl_4$, $CHCl_3$, $CH_2Cl_2$, hydrofluorocarbon compounds such as, e.g., $CH_2F$—$CF_3$ (R134a), ethers such as, e.g., dimethyl ether and methyl tert-butyl ether and esters such as, e.g., ethyl acetate and malonic esters.

The process of the invention generally comprises the following steps:

a) feeding an aqueous solution of the surfactant (FS) and/or (HS) into the polymerization reactor, possibly in combination with deionized water, so as to achieve the required concentration of surfactant (FS) and/or in the aqueous phase;

b) adding the required amount of functional PFPE to said aqueous phase;
c) optionally adding into the aqueous medium chain transfer agent(s), stabilizer(s) and/or other polymerization additive (s);
d) adding vinylidene fluoride, possibly in combination with other copolymerizable monomers, if required;
d) adding the polymerization initiator and, optionally, during the polymerization, further adding additional amounts of VDF monomer and/or comonomers, initiators, transfer agents;
f) recovering from the reactor the polymer (F) dispersion.

Polymerization is generally carried out at a pressure of at least 350 psi, preferably of at least 400 psi, more preferably of at least 500 psi.

Polymerization can be carried out at a temperature of at least 50° C., preferably of at least 60° C., more preferably of at least 80° C.

Upper temperature is not particularly limited, provided that an aqueous phase is maintained in polymerization conditions. Generally temperature will not exceed 130° C., preferably 125° C.

The invention further pertains to an aqueous dispersion of polymer (F), as above described, said aqueous dispersion comprising at least one surfactant (FS), and/or one surfactant (HS) as above detailed, and at least one functional PFPE as above detailed.

The aqueous dispersion of the invention is advantageously obtained from the process of the invention.

Still an object of the invention is the use of the dispersion, as above detailed, for the manufacture of paints.

With the aim of being used for formulating paints, the aqueous dispersions of polymer (F) as above detailed is generally coagulated so as to obtain a dry powder of polymer (F).

Said polymer (F) is generally dispersed in a suitable organic dispersing medium, typically a latent or intermediate solvent of polymer (F).

An intermediate solvent for the polymer (F) is a solvent which does not dissolve or substantially swell the polymer (F) at 25° C., which solvates polymer (F) at its boiling point, and retains polymer (F) in solvated form, i.e. in solution, upon cooling.

A latent solvent for the polymer (F) is a solvent which does not dissolve or substantially swell polymer (F) at 25° C., which solvates polymer (F) at its boiling point, but on cooling, polymer (F) precipitates.

Latent solvents and intermediate solvents can be used alone or in admixture. Mixtures of one or more than one latent solvent with one or more than one intermediate solvent can be used.

Intermediate solvents suitable for polymer (F) paint formulations are notably butyrolactone, isophorone and carbitol acetate.

Latent solvents suitable for suitable for polymer (F) paint formulations are notably methyl isobutyl ketone, n-butyl acetate, cyclohexanone, diacetone alcohol, diisobutyl ketone, ethyl acetoacetate, triethyl phosphate, propylene carbonate, triacetin (also known as 1,3-diacetyloxypropan-2-yl acetate), dimethyl phthalate, glycol ethers based on ethylene glycol, diethylene glycol and propylene glycol, and glycol ether acetates based on ethylene glycol, diethylene glycol and propylene glycol.

Non limitative examples of glycol ethers based on ethylene glycol, diethylene glycol and propylene glycol are notably ethylene glycol monomethyl ether, ethylene glycol monoethyl ether, ethylene glycol monopropyl ether, ethylene glycol monobutyl ether, ethylene glycol dimethyl ether, ethylene glycol diethyl ether, ethylene glycol dibutyl ether, diethylene glycol monomethyl ether, diethylene glycol monoethyl ether, diethylene glycol mono-n-butyl ether, propylene glycol methyl ether, propylene glycol dimethyl ether, propylene glycol n-propyl ether.

Non limitative examples of glycol ether acetates based on ethylene glycol, diethylene glycol and propylene glycol are notably ethylene glycol methyl ether acetate, ethylene glycol monethyl ether acetate, ethylene glycol monobutyl ether acetate, propylene glycol methyl ether acetate.

Non-solvents for polymer (F) such as methanol, hexane, toluene, ethanol and xylene may also be used in combination with latent solvent and/or intermediate solvent for special purpose, e.g. for controlling paint rheology, in particular for spray coating.

Typically, the polymer (F) paint formulation will comprise additional ingredients, including notably, (meth)acrylic resins, pigments, fillers, stabilizers and the like.

The invention will be now described with reference to the following examples, whose purpose is merely illustrative and not limitative of the scope of the invention.

Should the disclosure of any patents, patent applications, and publications which are incorporated herein by reference conflict with the description of the present application to the extent that it may render a term unclear, the present description shall take precedence.

Example 1: General Polymerization Procedure with Compound $CF_3CF_2O$—$CF_2CF_2$—$O$—$CF_2$—$COOX_a'$ (IIIA), $X_a'=NH_4$ In a typical polymerization run, the 7.57 L reactor was charged with 5289 g of deionized water, 86 g of 10% w/w aqueous solution of surfactant (IIIA), with $X_a=NH_4$, 5.4 mg of a functional PFPE complying with formula HOOC—$CF_2$—$O$—$(CF_2)_{n''}(CF_2CF_2O)_{m''}$—$CF_2$—COOH, with n" and m" such that the number averaged molecular weight is about 1800 (said functional PFPE having a solubility of less than 0.1% wt in water at 25° C.), and 4 g of wax.

The reactor was heated to 100° C. and vented for 2 min. The temperature was increased to 122.5 C and the reactor was pressurized with vinylidene fluoride (VDF) to 650 psi. 24.4 mL of pure di-tert-butyl peroxide were added to the reactor to initiate polymerization, and the pressure was maintained at 650 psi throughout polymerization.

Upon reaching conversion (2298 g of consumed monomer), the monomer feed and agitation were interrupted, the reactor was cooled, and the polymer latex was collected from the reactor.

The latex was filtered to collect eventual coagulum and the reactor was inspected to determine the amount of build-up (i.e. polymer stuck onto the agitation blade and reactor walls).

Example 2: General Polymerization Procedure with Compound

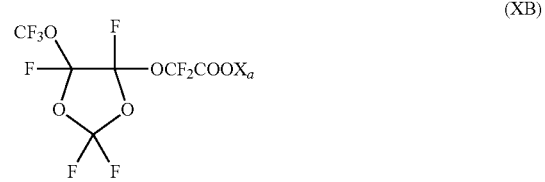

(XB)

$X_a'$=NH$_4$

In a typical polymerization run, the 7.57 L reactor was charged with 5241 g of deionized water, 134 g of a 10% w/w aqueous solution of surfactant (XB), with $X_a'$=NH$_4$, 5.4 mg of same functional PFPE of Ex. 1, and 4 g of wax. The reactor was heated to 100° C. and vented for 2 min.

The temperature was increased to 122.5° C. and the reactor was pressurized with vinyledene fluoride (VDF) to 650 psi. 24.4 mL of pure di-tert-butyl peroxide were added to the reactor to initiate polymerization, and the pressure was maintained at 650 psi throughout polymerization. Upon reaching target conversion (2298 g of consumed monomer), the monomer feed and agitation were interrupted, the reactor was cooled, and the polymer latex was collected from the reactor. The latex was filtered to collect eventual coagulum and the reactor was inspected to determine the amount of build-up.

Results of polymerization runs are summarized in the following tables, including reference runs carried out in the absence of functional PFPE.

TABLE 1

| Run | Conc. (IIIA) $X_a$ = NH$_4$ (g/l) | Conc. of funct PFPE (g/l) | APS§ (nm) | Solid content (% w/w) | Coagulum (g) | Build up (g) | Latex viscosity (kPoise) |
|---|---|---|---|---|---|---|---|
| 1-a comp | 0.60 | none | 585 | 10.9 | 0 | 1784 | 34.014 |
| 1-b comp | 1.00 | none | 483 | 26.82 | 467.0 | 215 | 32.082 |
| 1-c comp | 2.00 | none | 328 | 29.06 | 14.8 | 58 | 31.598 |
| 1-d | 1.60 | 0.001 | 287 | 29.46 | 35.0 | 47 | 32.158 |
| 1-e | 1.20 | 0.001 | 288 | 28.75 | 182.0 | 133 | 30.968 |
| 1-f | 1.00 | 0.001 | 284 | 28.6 | 224.0 | 114 | 32.979 |
| 1-g | 1.00 | 0.002 | 251 | 29.35 | 93.4 | 43 | 32.754 |
| 1-h | 1.00 | 0.008 | 192 | 30.7 | 14.0 | 78 | n.d. |
| 1-i | 1.00 | 0.15 | 120 | 27.16 | 17.0 | 40 | 28.029 |
| 1-j | 1.00 | 0.30 | 108 | 30.12 | 12.0 | 19 | 24.028 |

§average primary particle size

Data hereby provided well demonstrate that surfactant (FS) alone cannot provide for VDF polymers having average particle sizes ranging from 100 to 300 nm, as required for paint formulation.

On the contrary, addition of limited amount of functional PFPE enabled efficient tuning of particle size. Examples 1-d to 1-f show that average particle size is substantially identical when changing concentration of surfactant (FS). On the contrary, runs 1-f to 1-g, well demonstrate the ability of obtaining VDF polymer dispersions with average sizes from 100 to 300 nm by changing concentration of the functional PFPE.

TABLE 2

| Run | Conc. (XB) $X'_a$ = NH$_4$ (g/l) | Conc. of funct PFPE (g/l) | APS (nm) | Solid content (% w/w) | Coagulum (g) | Build-up (g) | Latex viscosity (kPoise) |
|---|---|---|---|---|---|---|---|
| 2-b | 2.50 | 0.001 | 282 | 28.13 | 163 | 169 | 32.199 |

Comparative Example 3—Polymerization with Compound

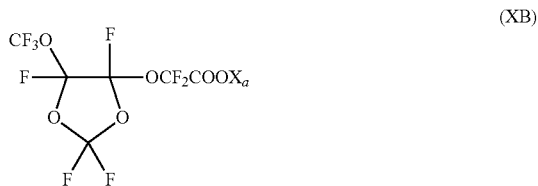

(XB)

$X_a'$=NH$_4$ and Functional PFPE Having Low Molecular Weight and High Solubility Same procedure as detailed in Example 2 was followed but using as functional PFPE a compound complying with formula H$_4$NOOC—CF$_2$—O—(CF$_2$)$_{n''}$(CF$_2$CF$_2$O)$_{m''}$—CF$_2$—COONH$_4$, with n" and m" such that the number averaged molecular weight is about 460 and having a solubility of more than 20% wt in water at 25° C. By combining said functional PFPE with compound (XB) with $X'_a$=NH$_4$, it was not possible to efficiently nucleating and stabilizing the dispersion. Huge build-up of polymer onto the reactor walls, low solids and extremely large particles were obtained in these conditions. Results are summarized in Table 3 herein below.

TABLE 3

| Run | Conc. (XB) X'$_a$ = NH$_4$ (g/l) | Conc. of funct PFPE (g/l) | APS (nm) | Solid content (% w/w) | Coagulum (g) | Build-up (g) | Latex viscosity (kPoise) |
|---|---|---|---|---|---|---|---|
| 3-a comp | 0.50 | 1.5 | 1046 | 0.96 | 0 | 395 | n.d. |

Example 4: General Polymerization Procedure with Compound 1 Octyl-Sulfonate

A 7.5-liter stainless steel horizontal reactor, equipped with a paddle agitator, was charged with a total of 5.375 kg of deionized water and aqueous solution of a surfactant mixture containing 1-octanesulfonate and same functional PFPE used in example 1, such that the concentration of 1-octanesulfonate was 1.2 g/L and of the functional PFPE was 13 mg/L in the aqueous phase of the reactor. In addition, 4 g of a hydrocarbon wax melting at 50 to 60° C. was added. The reactor was sealed and deaerated by heating with agitation to 100° C., then venting steam and air from the reactor for two minutes. The reactor was then heated to 122.5° C. Sufficient vinylidene fluoride monomer was introduced from a cylinder to bring the reactor pressure to 650 psig (45 bar). Then 21.5 mL of di-tert-butyl peroxide (DTBP) was pumped into the reactor to initiate the polymerization reaction. After an induction period of approximately 15 minutes, the reactor pressure decreased slightly, indicating initiation. Vinylidene fluoride then was continuously added as needed to maintain the reactor pressure at 650 psig (45 bar) while the reactor temperature was maintained at 122.5° C. by pumping water and ethylene glycol through the reactor jacket. After about 262 minutes, when a total of 2298 g of vinylidene fluoride had been fed to the reactor, the monomer feed was stopped. In order to maximize yield, the system was allowed to continue reacting until the reactor pressure was decreased to about 150 psig (about 10 bar). At that point, the reactor was cooled, the unreacted vinylidene fluoride was vented, and the latex was drained from the reactor. The resulting latex was screened through an 80 mesh screen to remove precoagulated large particles. In addition, the reactor wall was cleaned mechanically to remove any adhering precoagulated large particles. A coagulation loss (defined as the percentage of the original 2298 g of vinylidene fluoride monomer that was recovered as precoagulated large particles) of 4.1% was found. The screened latex was analyzed by laser light scattering and found to have an average latex particle size of 262 nm.

Example 5: General Polymerization Procedure with Compound Sodium Octyl Sulphate The polymerization procedure in Example 4 was repeated, with the surfactant system consisting of sodium octyl sulfate (Texapon 842, from Cognis) at 1.2 g/L and same functional PFPE of example 1 at 13 mg/L in the aqueous phase of the reactor. After about 436 minutes, when a total of 2298 g of vinylidene fluoride had been fed to the reactor, the monomer feed was stopped and a similar react down procedure was followed. The resulting latex was found to have a coagulation loss of 8.8% and an average particle size of 208 nm.

Comparative Example 6: General Polymerization Procedure with Compound 1 Octyl-Sulfonate without any Added Functional PFPE The polymerization procedure in Example 4 was followed, with the surfactant system consisting of only sodium 1-octanesulfonate at 1.2 g/L in the aqueous phase of the reactor, with no functional PFPE added. After about 274 minutes, when a total of 1976 g of vinylidene fluoride had been fed to the reactor, the monomer feed was stopped and a similar react down procedure was followed. The resulting latex was found to have a coagulation loss of 44.8% and an average particle size of 481 nm.

Comparative Example 7: General Polymerization Procedure with Compound Sodium Octyl Sulfate without any Added Functional PFPE The polymerization procedure of Example 4 was followed, with the surfactant system consisting of only sodium octyl sulfate at 1.2 g/L in the aqueous phase of the reactor. After about 428 minutes, when a total of 2298 g of vinylidene fluoride had been fed to the reactor, the monomer feed was stopped and a similar react down procedure was followed. The resulting latex was found to have a coagulation loss of 36.7% and an average particle size of 412 nm.

The invention claimed is:

1. A process for manufacturing a dispersion of a vinylidene fluoride (VDF) thermoplastic polymer [polymer (F)], said process comprising polymerizing VDF in an aqueous phase comprising:
    at least one fluorinated surfactant (FS) complying with formula (IB) here below:

wherein:
    $X_1$, $X_2$ and $X_3$, equal to or different from each other, are independently selected from the group consisting of H, F and $C_1$-$C_6$ (per)fluoroalkyl groups, optionally comprising one or more catenary or non-catenary oxygen atoms,
    $R_F$ represents a divalent perfluorinated $C_1$-$C_3$ bridging group,
    L represents a bond or a divalent group and
    Y represents an anionic functionality, selected from the group consisting of:

-continued

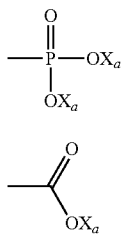
(2')

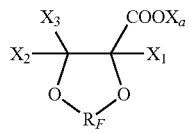
(3')

wherein $X_a$ is a hydrogen atom, a monovalent metal, or an ammonium group of formula —N(R'$_n$)$_4$, wherein R'$_n$, equal or different at each occurrence, is a hydrogen atom or a $C_1$-$C_6$ hydrocarbon group;

wherein the at least one fluorinated surfactant has a molecular weight of less than 400; and at least one functional (per)fluoropolyether (functional PFPE) comprising at least one (per)fluoropolyoxyalkylene chain [chain (R'$_F$)] and at least one functional group, said functional PFPE having a number average molecular weight of at least 1000 and a solubility in water of less than 1% by weight at 25° C., wherein said functional PFPE is present in the aqueous phase in an amount of 0.001 to 0.3 g/L.

2. The process of claim 1, wherein the fluorinated surfactant (FS) complies with formula (IIIB) here below:

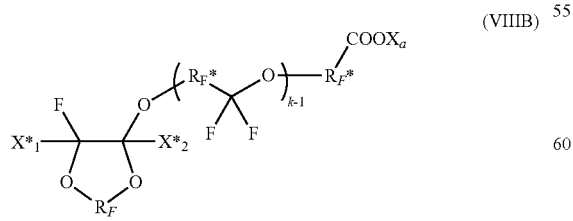
(IIIB)

wherein:
$X_1$, $X_2$ and $X_3$, equal to or different from each other, are independently selected from the group consisting of H, F and $C_1$-$C_6$ (per)fluoroalkyl groups, optionally comprising one or more catenary or non-catenary oxygen atoms, $R_F$ represents a divalent perfluorinated $C_1$-$C_3$ bridging group, and $X_a$ is a hydrogen atom, a monovalent metal, or an ammonium group of formula —N(R'$_n$)$_4$, wherein R'$_n$, equal or different at each occurrence, is a hydrogen atom or a $C_1$-$C_6$ hydrocarbon group.

3. The process of claim 1, wherein the fluorinated surfactant (FS) complies with formula (VIIIB) here below:

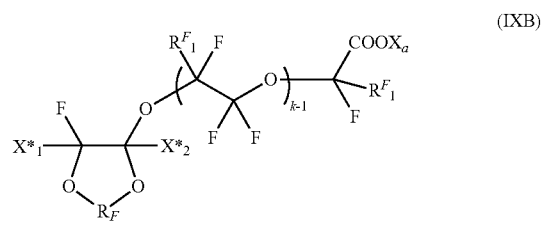
(VIIIB)

wherein:
$R_F$ represents a divalent perfluorinated $C_1$-$C_3$ bridging group;

$X_a$ is a hydrogen atom, a monovalent metal, or an ammonium group of formula —N(R'$_n$)$_4$, wherein R'$_n$, equal or different at each occurrence, is a hydrogen atom or a $C_1$-$C_6$ hydrocarbon group;

$X^*_1$ and $X^*_2$, equal to or different from each other, are independently a fluorine atom, a —R'$_f$ group or a —OR'$_f$ group, wherein R'$_f$ is a $C_1$-$C_3$ perfluoroalkyl group;

$R^*_f$ is a divalent fluorinated group; and k is an integer from 1 to 3.

4. The process of claim 3, wherein the fluorinated surfactant (FS) complies with formula (IXB) here below:

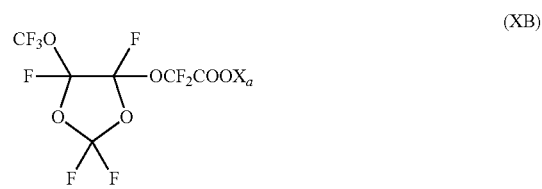
(IXB)

wherein
$R_F$ represents a divalent perfluorinated $C_1$-$C_3$ bridging group; and $X_a$ is a hydrogen atom, a monovalent metal, or an ammonium group of formula —N(R'$_n$)$_4$, wherein R'$_n$, equal or different at each occurrence, is a hydrogen atom or a $C_1$-$C_6$ hydrocarbon group;

$X^*_1$ and $X^*_2$, equal to or different from each other, are independently a fluorine atom, a —R'$_f$ group or a —OR'$_f$ group, wherein R'$_f$ is a $C_1$-$C_3$ perfluoroalkyl group, $R^F_1$ is a fluorine atom or a —CF$_3$ group and k is an integer from 1 to 3.

5. The process of claim 4, wherein the fluorinated surfactant (FS) is selected from the group consisting of surfactants (FS) having formulae (X) and (XI) here below:

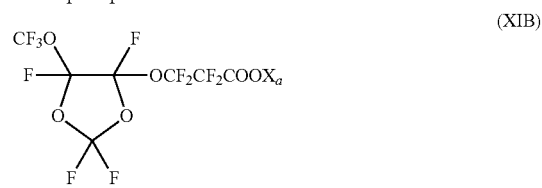
(XB)

(XIB)

wherein $X_a$ is a hydrogen atom, a monovalent metal, or an ammonium group of formula —N(R'$_n$)$_4$, wherein R'$_n$, equal or different at each occurrence, is a hydrogen atom or a $C_1$-$C_6$ hydrocarbon group.

6. The process of claim 1, wherein the functional PFPE complies with formula (XII) here below:

$$T_1\text{-}(CFW_1)_{p1}O\text{—}R_F\text{—}(CFW_2)_{p2}\text{-}T_2 \qquad (XII)$$

wherein:
$R_F$ is a (per)fluoropolyoxyalkylene chain [chain (R'$_F$)] such that the number average molecular weight of the functional PFPE is at least 1000;

$T_1$ and $T_2$, equal to or different from each other, are selected from:
i) functional end-groups selected from the group consisting of carboxylic acid, phosphonic acid and sulphonic acid groups, in their acid or salt form, and
ii) non-functional end-groups selected from a group consisting of a fluorine atom, a chlorine atom and a $C_1$-$C_3$ (per)fluoroalkyl group comprising, optionally, one or more chlorine atoms, with the proviso that at least one of $T_1$ and $T_2$ is a functional end-group as defined above;

$W_1$ and $W_2$, equal to or different from each other, independently represent a fluorine atom or a —$CF_3$ group;

$p_1$ and $p_2$, equal to or different from each other, are independently integers comprised between 1 and 3.

7. The process of claim 6, wherein the functional PFPE complies with formula (XIV) here below:

$X_p$OOC—$CF_2$—O—$(CF_2)_{n'}(CF_2CF_2O)_{m'}$—$CF_2$—COO$X_p$ (XIV)

wherein n' and m' are independently integers >0 such that the number average molecular weight of the functional PFPE is at least 1000, wherein the recurring units of ($CF_2$) and ($CF_2CF_2O$) are generally statistically distributed along the perfluoropolyoxyalkylene chain, and wherein $X_p$, equal to or different from each other, is a hydrogen atom, a monovalent metal, or an ammonium group of formula —$N(R'_n)_4$, wherein $R'_n$, equal or different at each occurrence, is a hydrogen atom or a $C_1$-$C_6$ hydrocarbon group.

8. A process for manufacturing a dispersion of a vinylidene fluoride (VDF) thermoplastic polymer [polymer (F)], said process comprising polymerizing VDF in an aqueous phase comprising:
at least one surfactant selected from the group consisting of non-fluorinated surfactants [surfactant (HS)] and fluorinated surfactants having a molecular weight of less than 400 [surfactant (FS)]; and
at least one functional (per)fluoropolyether (functional PFPE) that complies with formula (XIV) here below:

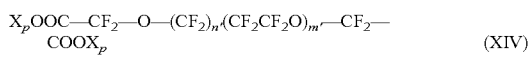

$X_p$OOC—$CF_2$—O—$(CF_2)_{n'}(CF_2CF_2O)_{m'}$—$CF_2$—COO$X_p$ (XIV)

wherein n' and m' are independently integers >0 such that the number average molecular weight of the functional PFPE is at least 1000, wherein the recurring units of ($CF_2$) and ($CF_2CF_2O$) are generally statistically distributed along the perfluoropolyoxyalkylene chain, and wherein $X_p$, equal to or different from each other, is a hydrogen atom, a monovalent metal, or an ammonium group of formula —$N(R'_n)_4$, wherein $R'_n$, equal or different at each occurrence, is a hydrogen atom or a $C_1$-$C_6$ hydrocarbon group, said functional PFPE having a solubility in water of less than 1% by weight at 25° C.,
wherein said functional PFPE is present in the aqueous phase in an amount of 0.001 to 0.3 g/L.

9. The process of claim 8, wherein the surfactant is a surfactant (FS) complying with formula (IA) here below:

$R_f$—$(OCF_2CF_2)_{k-1}$—O—$CF_2$—COO$X_a$ (IA)

wherein $R_f$ is a $C_1$-$C_3$ perfluoroalkyl group comprising, optionally, one or more ether oxygen atoms, k is 2 or 3 and $X_a$ is selected from the group consisting of a monovalent metal and an ammonium group of formula $NR^N_4$, wherein $R^N$, equal or different at each occurrence, is a hydrogen atom or a $C_1$-$C_3$ alkyl group.

10. The process of claim 9, wherein the surfactant (FS) complies with formula (IIIA) here below:

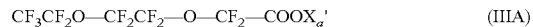

$CF_3CF_2O$—$CF_2CF_2$—O—$CF_2$—COO$X_a'$ (IIIA)

wherein $X_a'$ is selected from the group consisting of Li, Na, K, $NH_4$ and $NR^{N'}_4$, wherein $R^{N'}$ is a $C_1$-$C_3$ alkyl group.

11. The process of claim 8, wherein the surfactant (FS) complies with formula (IIIB) here below:

(IIIB)

wherein:
$X_1$, $X_2$ and $X_3$, equal to or different from each other, are independently selected from the group consisting of H, F and $C_1$-$C_6$ (per)fluoroalkyl groups, optionally comprising one or more catenary or non-catenary oxygen atoms, $R_F$ represents a divalent perfluorinated $C_1$-$C_3$ bridging group, and $X_a$ is a hydrogen atom, a monovalent metal, or an ammonium group of formula —$N(R'_n)_4$, wherein $R'_n$, equal or different at each occurrence, is a hydrogen atom or a $C_1$-$C_6$ hydrocarbon group.

12. The process of claim 8, wherein the surfactant (FS) complies with formula (VIIIB) here below:

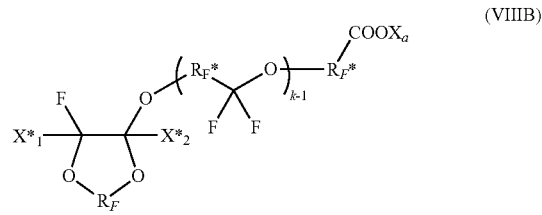

(VIIIB)

wherein:
$R_F$ represents a divalent perfluorinated $C_1$-$C_3$ bridging group;

$X_a$ is a hydrogen atom, a monovalent metal, or an ammonium group of formula —$N(R'_n)_4$, wherein $R'_n$, equal or different at each occurrence, is a hydrogen atom or a $C_1$-$C_6$ hydrocarbon group;

$X^*_1$ and $X^*_2$, equal to or different from each other, are independently a fluorine atom, a —$R'_f$ group or a —$OR'_f$ group, wherein $R'_f$ is a $C_1$-$C_3$ perfluoroalkyl group;

$R^*_f$ is a divalent fluorinated group; and
k is an integer from 1 to 3.

13. The process of claim 12, wherein the surfactant (FS) complies with formula (IXB) here below:

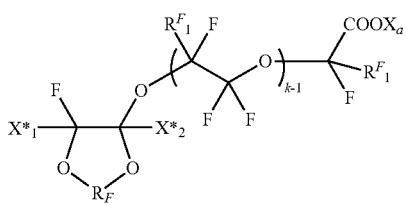

(IXB)

wherein $R_F$ represents a divalent perfluorinated $C_1$-$C_3$ bridging group; and $X_a$ is a hydrogen atom, a monovalent metal, or an ammonium group of formula —$N(R'_n)_4$, wherein $R'_n$, equal or different at each occurrence, is a hydrogen atom or a $C_1$-$C_6$ hydrocarbon group;

$X^*_1$ and $X^*_2$, equal to or different from each other, are independently a fluorine atom, a —$R'_f$ group or a —$OR'_f$ group, wherein $R'_f$ is a $C_1$-$C_3$ perfluoroalkyl group, $R^F_1$ is a fluorine atom or a —$CF_3$ group and k is an integer from 1 to 3.

14. The process of claim 13, wherein the surfactant (FS) is selected from the group consisting of surfactants (FS) having formulae (X) and (XI) here below:

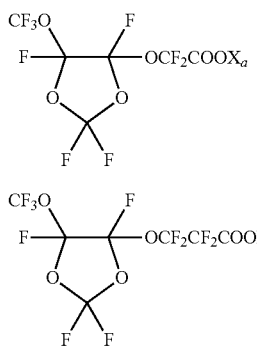

(XB)

(XIB)

wherein $X_a$ is a hydrogen atom, a monovalent metal, or an ammonium group of formula —$N(R'_n)_4$, wherein $R'_n$, equal or different at each occurrence, is a hydrogen atom or a $C_1$-$C_6$ hydrocarbon group.

15. The process of claim 8, wherein the surfactant is a surfactant (FS) complying with formula:

$R_{FS}$-E-$Y_r$ wherein:

$Y_r$ is an anionic functionality, selected from the group consisting of:

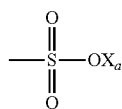

(1')

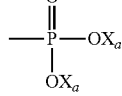

(2')

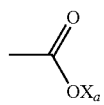

(3')

wherein $X_a$ is a hydrogen atom, a monovalent metal, or an ammonium group of formula —$N(R'_n)_4$, wherein $R'_n$, equal or different at each occurrence, is a hydrogen atom or a $C_1$-$C_6$ hydrocarbon group;

E is a $C_4$-$C_{24}$ hydrocarbon non fluorinated divalent group, possibly comprising one or more catenary oxygen atom(s); and $R_{FS}$ is a —$OR^{FS}_f$ group, a —$N(R^{FS}_f)_2$, or a —$OAr(R^{FS}_f)_r$ group, wherein $R^{FS}_f$, equal to or different from each other at each occurrence, is a $C_1$-$C_6$ perfluoroalkyl group, Ar is an aromatic moiety, and r is an integer of 1 to 3.

16. The process of claim 15, wherein the surfactant (FS) complies with formula:

$R_{FS}(CH_2)_n SO_3 X_r$ wherein:

$X_r$ is a hydrogen atom, a monovalent metal, or an ammonium group of formula —$N(R'_n)_4$, wherein $R'_n$, equal or different at each occurrence, is a hydrogen atom or a $C_1$-$C_6$ hydrocarbon group;

n is an integer of 4 to 20; and $R_{FS}$ is a —$OR^{FS}_f$ group, a —$N(R^{FS}_f)_2$, or a —$OAr(R^{FS}_f)_r$ group, wherein $R^{FS}_f$, equal to or different from each other at each occurrence, is a $C_1$-$C_6$ perfluoroalkyl group, Ar is an aromatic moiety, and r is an integer of 1 to 3.

17. The process according to claim 8, wherein said at least one surfactant is selected from the group consisting of non-fluorinated surfactants [surfactants (HS)].

18. The process of claim 17, wherein said surfactants (HS) are selected from the group consisting of:

alkanesulfonates, selected from the group consisting of linear $C_7$-$C_{10}$ 1-alkanesulfonates, linear $C_7$-$C_{20}$ 2-alkanesulfonates, and linear $C_7$-$C_{20}$ 1,2-alkanedisulfonates; and alkylsulfates selected from the group consisting of linear $C_7$-$C_{20}$ 1-alkylsulfates, linear $C_7$-$C_{20}$ 2-alkylsulfates, and linear $C_7$-$C_{20}$ 1,2-alkyldisulfates.

* * * * *